United States Patent
Damico et al.

(10) Patent No.: US 10,076,985 B2
(45) Date of Patent: Sep. 18, 2018

(54) ADJUSTABLE FOOTREST

(71) Applicant: GM GLOBAL TECHNOLOGY OPERATIONS LLC, Detroit, MI (US)

(72) Inventors: Tania A. Damico, Sao Bernardo do Campo (BR); Denis Y. Tanaka, Sao Caetano do Sul (BR)

( * ) Notice: Subject to any disclaimer, the term of this patent is extended or adjusted under 35 U.S.C. 154(b) by 72 days.

(21) Appl. No.: 15/411,128

(22) Filed: Jan. 20, 2017

(65) Prior Publication Data

US 2018/0208095 A1 Jul. 26, 2018

(51) Int. Cl.
*B60N 3/06* (2006.01)
*B60N 99/00* (2006.01)

(52) U.S. Cl.
CPC ............. *B60N 3/063* (2013.01); *B60N 99/00* (2013.01)

(58) Field of Classification Search
CPC ................................ B60N 3/063; B60N 99/00
USPC ......................................................... 296/75
See application file for complete search history.

(56) References Cited

U.S. PATENT DOCUMENTS

| | | | | |
|---|---|---|---|---|
| 5,183,308 A | * | 2/1993 | Koga | B60N 3/063 180/90.6 |
| 6,073,515 A | * | 6/2000 | Elton | B60N 3/063 296/75 |
| 6,318,785 B1 | * | 11/2001 | Tousignant | B60N 2/0228 296/75 |
| 6,834,904 B2 | * | 12/2004 | Sauvonnet | B60N 3/063 296/75 |
| 6,962,094 B2 | * | 11/2005 | Porter | G05G 1/405 74/512 |
| 2003/0094070 A1 | * | 5/2003 | O'Neill | G05G 1/36 74/560 |
| 2014/0035341 A1 | * | 2/2014 | Bohmer | B60N 3/063 297/423.1 |

* cited by examiner

*Primary Examiner* — Jason S Morrow
*Assistant Examiner* — E Turner Hicks

(57) ABSTRACT

An adjustable footrest for an occupant of a vehicle is presented herein. The footrest includes: a footpad, motor, and stem. The footpad extends from the foot well of the vehicle and is configured for engagement by a foot. The motor has an elongated axle. The stem is configured to be mounted to the underside of footpad at a first end and to the axle at a second end. Moreover, the stem second end moves telescopically along the axle body during motor operation, wherein such telescopic movement produces movement of the stem first end along the underside of the footpad, and wherein such stem first end movement produces corresponding angular movement of the footpad.

17 Claims, 5 Drawing Sheets

ADJUSTABLE FOOTREST

INTRODUCTION

Fixed-position footrests are generally not readily adjustable to different angles and forward-backward telescopic positions to accommodate vehicle occupants of different sizes and allow them to change foot positions. As a result, these occupants tend to avoid using their footrest during long journeys and end up being uncomfortable due to cramping and tiring in their legs. It would therefore be desirable to have a footrest which could readily be adjusted to different angles and positions to allow for more comfortable vehicle travel.

SUMMARY

An adjustable footrest for an occupant of a vehicle is presented herein. The footrest includes: a footpad, motor, and stem. The footpad extends from the foot well of the vehicle and is configured for engagement by a foot. The motor has an elongated axle. The stem is configured to be mounted to the underside of footpad at a first end and to the axle at a second end. Moreover, the stem second end moves telescopically along the axle body during motor operation, wherein such telescopic movement produces movement of the stem first end along the underside of the footpad, and wherein such stem first end movement produces corresponding angular movement of the footpad.

The adjustable footrest may further include a second motor. The second motor has an elongated second axle connected to an adjustable footrest base. Moreover, the footrest base moves telescopically along the second axle body during second motor operation, and wherein such telescopic movement produces telescopic movement of the footpad.

The adjustable footrest may further include a first and second user switch. The first user switch is configured to control motor operation. The second user switch is configured to control second motor operation. The adjustable footrest may further include a mounting system configured to define slidable track movement of the stem first end along the underside of the footpad. The floorboard may be covered with carpeting, and the footpad may extend through a carpet cutout for movement of the footplate. The adjustable footrest may be configured for engagement by the left foot of a vehicle operator.

The stem second end may include an adapter configured to operatively connect to the axle body, the adapter also includes a threaded surface. In this instance, the axle-body surface may include threads configured to correspond with the adapter surface threads. Moreover, in this instance, the motor is configured to rotate the axle such that the adapter moves telescopically along the axle-body surface via an operative interaction between the adapter surface threads and axle-body surface threads.

A method of assembling an adjustable footrest for an occupant of a vehicle is also presented herein. The method includes the steps of: providing a footpad configured to extend from the foot well of the vehicle and for engagement by a foot; providing a motor including an elongated axle; providing a stem configured to be mounted to the underside of the footpad at a first end and to the axle at a second end; mounting the stem to the underside of the footpad at the first end; mounting the stem to the axle at the second end; connecting the motor to the base of the footpad; mounting the base of the footpad to the foot well of the vehicle; and allowing the footplate to be movable from a first angular position to a second angular position in the manner as follows—moving the stem second end telescopically along the axle body during motor operation; producing movement of the stem first end along the underside of the footpad, via the telescopic axle body movement; and producing angular movement of the footpad corresponding to the stem first end movement.

The method of assembling the footrest may further include the steps of: providing a second motor including an elongated second axle connected to an adjustable footrest base; connecting the second motor to the base of the footpad; and allowing the footplate to be movable from a first telescopic position to a second telescopic by moving the footrest base telescopically along the second axle body during second motor operation. The method of assembling the footrest may further include the steps of: providing a first user switch; providing a second user switch; installing the first user switch in the vehicle interior; installing the second user switch in the vehicle interior; enabling control of the motor operation via the first user switch; and enabling control of the second motor operation via the second user switch. The method of assembling the footrest may further include the steps of: providing a mounting system configured to define slidable track movement of the stem first end along the underside of the footpad; mounting the mounting system to the underside of the footpad; and allowing movement of the stem first end slidably along the footpad underside as defined by the mounting system.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
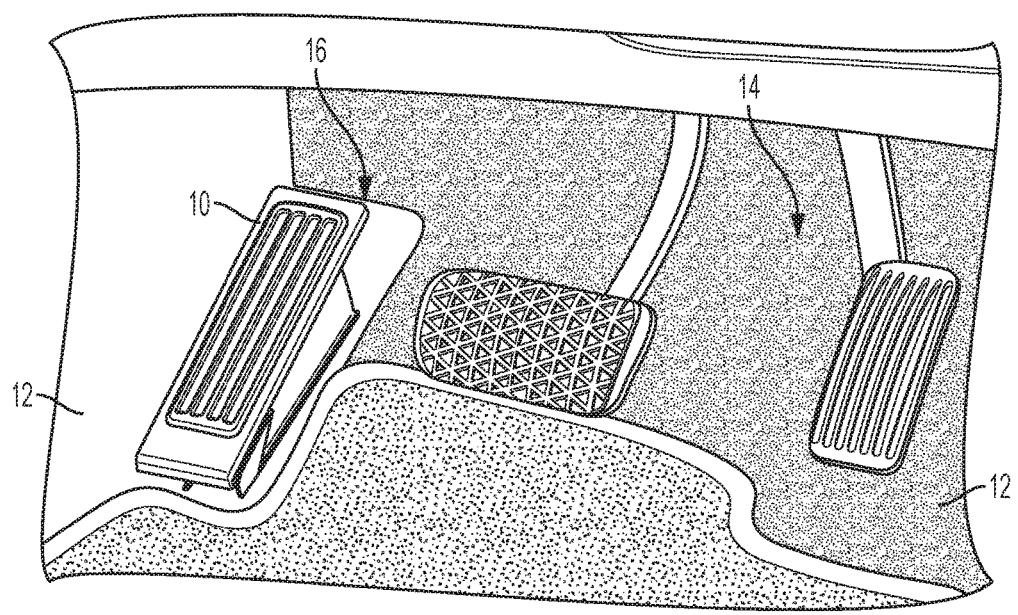
FIG. 1 shows an environment in which an adjustable footrest may be implemented.

With reference to FIG. 1, an adjustable footrest 10 can be seen to extend at an angular orientation from the floorboard 12 of the carpeted foot well 14 in an automobile. As shown, footrest 10 is located on the left side of well 14, which will allow the operator (i.e., driver) to engage their left foot (not shown) upon footpad 13 for comfort purposes. As shown, in this embodiment, floorboard 12 is completely covered with carpeting, except for a carpet cutout 16 in which footrest 10 extends to allow for movement of the footplate (discussed below) it has been envisioned that footrest 10 may be located in vehicles other than automobiles, such as, but not limited to, trucks, sports utility vehicles (SUVs), recreational vehicles (RVs), marine vessels (e.g., boats) and aircraft. It should also be understood that footrest 10 may be located in a vehicle's passenger foot well (not shown) to allow a passenger to engage either foot (depending upon the side of the foot well 14 in which footrest 10 is located).

Figure 2:
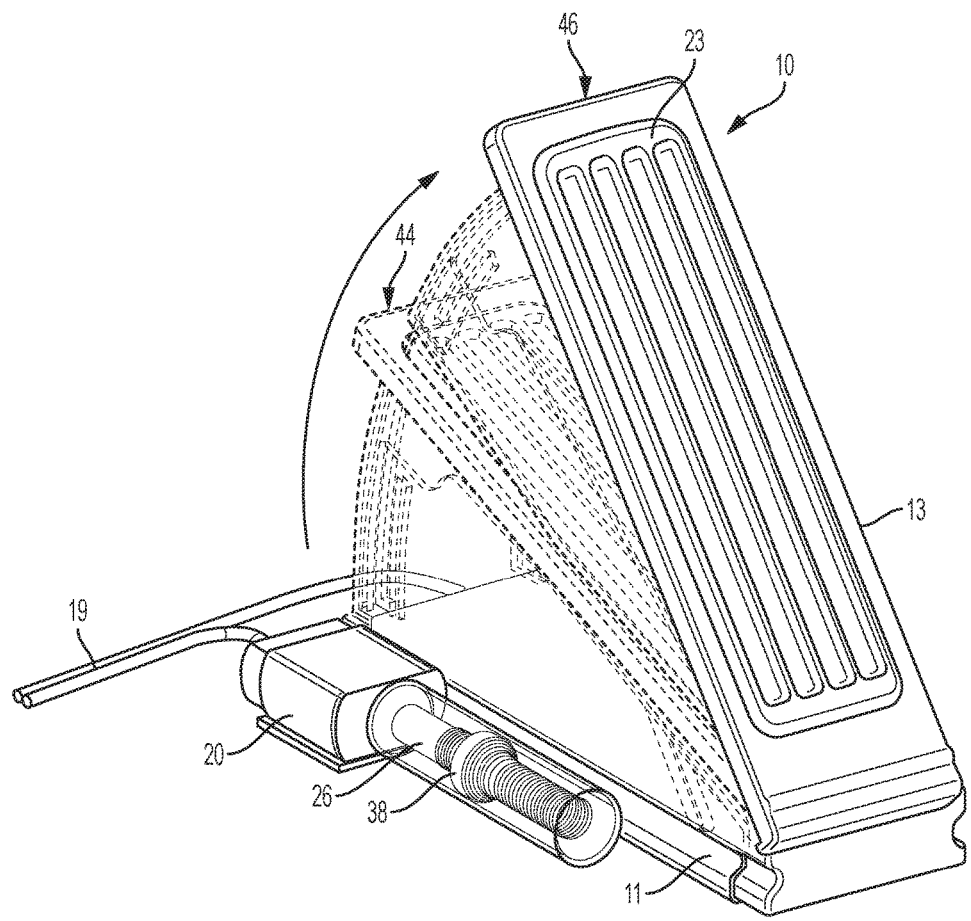
FIG. 2 shows a perspective view of an aspect of an embodiment of the adjustable footrest.
Figure 3:
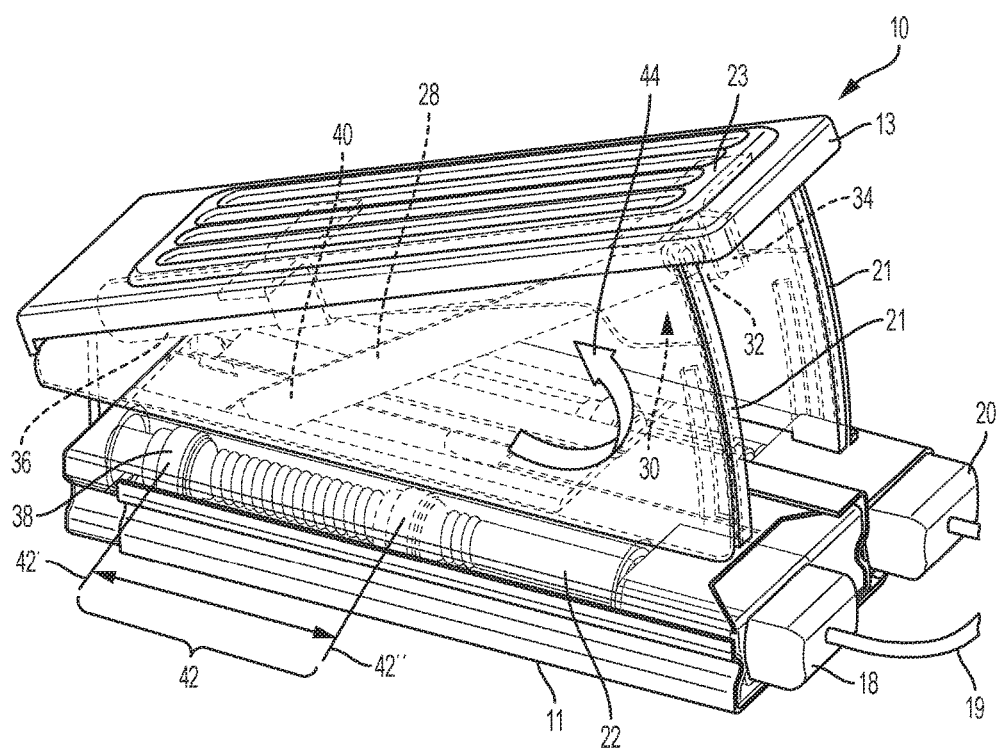
FIG. 3 shows other aspects of the adjustable footrest of FIG. 2.
Figure 4:
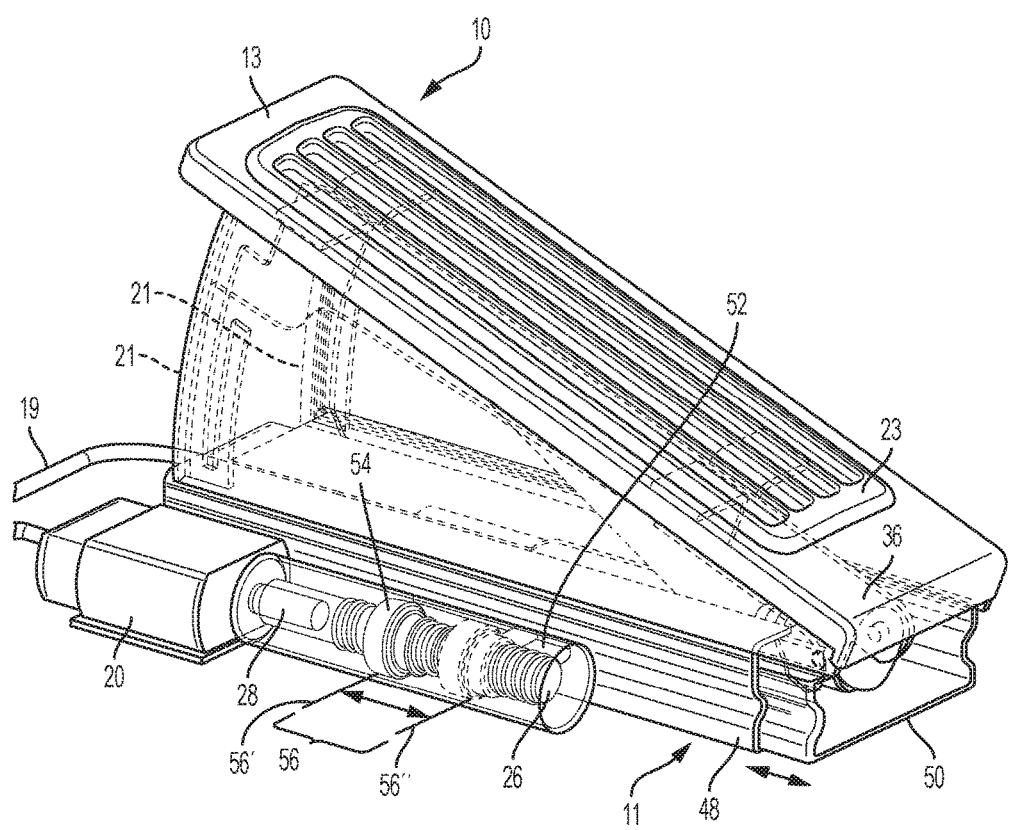
FIG. 4 shows another perspective view and other aspects of the adjustable footrest of FIG. 3.

As can be seen in FIGS. 2 through 4, an embodiment of footrest 10 includes a footpad 13 hindgedly mounted to one end of an adjustable footrest base 11 that includes a pair of electric motors—a first motor 18 and second motor 20. A pair of folding-fan panels 21 are affixed to both the underside of footpad 13 and footrest base 11 and encapsulate as well as protect the mechanical features that operatively adjust footpad 13. A foot grip 23 may also be mounted to the exposed side of footpad 13, and may be made of elastomeric material (e.g., rubber) or polymeric material (e.g., vinyl), to provide traction. Regarding motors 18, 20, both are wired 19 to the vehicle circuitry (not shown) through foot well 14. A first elongated axle 22 is insertionally connected to the rotor/drive axis 24 of first motor 18. A second, shorter, elongated axle 26 is moreover insertionally connected to the rotor/drive axis 28 of second motor 20. In addition, each axle 22, 26 has a series of threads on its outer surface (e.g., worm screw threads), which may span substantially from one axle end to the other.

A stem 28 is slidably mounted to the underside of footpad 13 through a mounting system 30. Mounting system 30 incorporates a hinge feature 32 rotatably clamped to a first end 34 of stem 28. Each side of hinge feature 32 is slidably interlocked into a matching side track which runs along the corresponding side of the underside of footpad 13. The center of hinge feature 32 also fits around a ridge 36 that runs the length of the footpad underside, to maintain insertion into the footpad underside tracks. As a result, the installed hinge feature 32 enables slidable, tracked movement of the stem first end 34 substantially along the underside of footpad 13.

A first ring adapter 38 (i.e., a nut) is located at the second end 40 of stem 28 and is installed over the first axle 22. This first ring adapter 38 includes a threaded inner surface (not shown) which corresponds to the thread series along the body of first axle 22. When first motor 18 is operated to rotate first axle 22, therefore, the first ring adapter 38 is adjusted forward/backward a telescopic distance 42 varied along the body of first axle 22 via the interactive screw action created by the corresponding thread series—as is generally understood of typical worm screw interactions.

Additionally, this telescopic movement of the stem second end 40 causes the stem first end 34 to slide along the underside of the footpad via the mounting system 30 (discussed above). Due to footpad 13 being hingedly mounted to base 11, when the stem first end 34 slides underneath footpad 13, corresponding angular movement 44 of the footpad is created. For example, with reference in particular to FIGS. 2 and 3, when first ring adapter 38 is at a first position 42', the stem first end 34 may produce footpad 13 to be at a first angular position 44 (e.g., of 20 degrees). On the other hand, when first ring adapter 38 is at a second position 42", the stem first end 34 may produce footpad 13 to be at second angular position 46 (e.g., of 130 degrees).

With reference in particular to FIG. 4, adjustable footrest base 11 includes two interlocking parts—an outer shell part 48 which acts as a guide rail and an interlocked as well as slidable inner part 50. The outer part 48 mounts to foot well 12 in a static manner. An elongated track orifice 52 also extends a certain length of the outer part 48 side.

Inner part 50 of footrest base 11 is itself connected to footpad 13. Inner part 50 includes a second ring adapter 54 (i.e., a nut) which protrudes through track 52 and is similar in structure and function to the first ring adapter 38 discussed above. As such, second ring adapter 54 is installed over second axle 26 and includes a threaded inner surface (not shown) which corresponds to the thread series along the body of second axle 26. When second motor 20 is operated to rotate second axle 26, therefore, second ring adapter 54 is moved a telescopic distance 56 along the body of second axle 26 via the interactive screw action created by the corresponding thread series. Movement of second ring adapter 54 thus causes the inner part 50 to move telescopically a length which is equivalent to distance 56. As a result, varied telescopic movement of the footpad 13 may be achieved. For example, when second ring adapter 54 is at a first position 56', inner part 50 may produce footpad 13 to be at a default position. Subsequently, when second ring adapter 54 is moved to a second position 56", inner part 50 may produce footpad 13 to be at a second telescopic position 30 millimeters forward/backward away from the default position.

Figure 5:
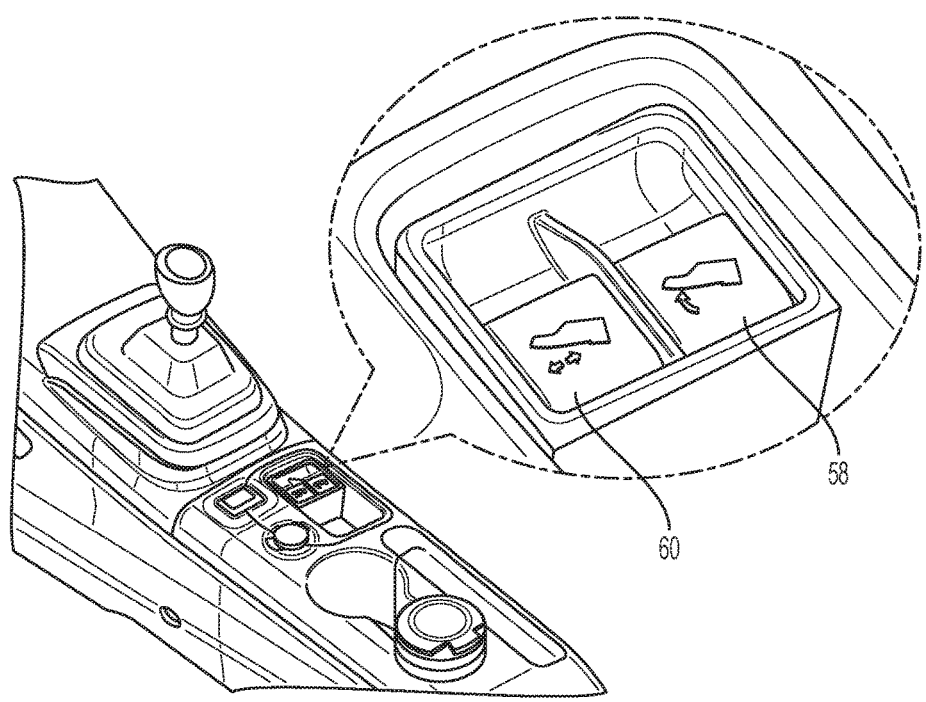
FIG. 5 shows a control aspect of an adjustable footrest embodiment.

As shown in FIG. 5, first and second motors 18, 20 are communicatively connected to user switches 58, 60 located within the vehicle interior (i.e., via wiring 19). The first user switch 58 is connected to first motor 18 and allows the vehicle operator to angularly adjust footpad 13 via the methodology discussed above. The second user switch 60 is connected to second motor 20 and allows the vehicle operator to telescopically adjust footpad 13 via the methodology discussed above. It should be understood that wiring 19 and user switches 58, 60 may be connected to any one of the Vehicle System Modules (VSMs), no shown, such as the vehicle's Body Control Module (BCM), to assist in the user switch 58, 60 control of footpad 13. Skilled artisans will see each of the footpad 13, footrest base 11, panels 21, axles 22, 26, stem 28, mounting system 30, ring adapters 38, 54, and switches 58, 60 may be constructed from materials such as, but not limited to, metallic material (e.g., sheet metal), polymeric material, elastomeric material, or some combination thereof.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An adjustable footrest for an occupant of a vehicle, the footrest comprising:
    a footpad which extends from the foot well of the vehicle, the footpad configured for engagement by a foot;
    a motor comprising an elongated axle;
    a stem configured to be slidably mounted to the underside of footpad at a first end and to the axle at a second end;
    wherein the stem second end moves telescopically along the axle body during motor operation, wherein such telescopic movement produces movement of the stem first end in a slidable manner along the underside of the footpad, and wherein such stem first end slide movement produces corresponding angular movement of the footpad;
    a second motor comprising an elongated second axle connected to an adjustable footrest base;
    wherein the footrest base moves telescopically along the second axle body during second motor operation, and wherein such telescopic movement produces telescopic movement of the footpad;
    a first user switch configured to control motor operation; and
    a second user switch configured to control second motor operation.

2. The adjustable footrest of claim 1, further comprising a mounting system configured to define slidable track movement of the stem first end along the underside of the footpad.

3. The adjustable footrest of claim 1, wherein:
    the stem second end comprises a ring adapter configured to be installed over the axle body, the ring adapter comprises a threaded inner surface;
    the axle-body surface comprises threads configured to correspond with the ring adapter surface threads; and
    wherein the motor is configured to rotate the axle such that the ring adapter moves telescopically along the axle-body surface via an interactive screw action between the ring adapter surface threads and axle-body surface threads.

4. The adjustable footrest of claim 1, wherein the floorboard is covered with carpeting, and the footrest extends through a carpet cutout for movement of the footpad.

5. The adjustable footrest of claim 1, wherein the adjustable footrest is configured for engagement by the left foot of a vehicle operator.

6. An adjustable footrest system for an occupant of a vehicle, the footrest comprising:
    a footpad which extends from the foot well of the vehicle, the footpad configured for engagement by a foot;
    a first motor communicatively connected to a first user switch located within the vehicle interior, the first motor comprising an elongated first axle;
    a second motor communicatively connected to a second user switch located within the vehicle interior, the second motor comprising an elongated second axle connected to an adjustable footrest base;
    a stem configured to be slidably mounted to the underside of the footpad at a first end and to the first axle at a second end;
    wherein the stem second end is configured to move telescopically along the first axle body during operation of the first motor via the first user switch, wherein the telescopic movement of the stem second end moves the stem first end in a slidable manner along the underside of the footpad, wherein such stem first end slide movement produces corresponding angular movement of the footpad;
    wherein the footrest base moves telescopically along the second axle body during second motor operation via the second user switch, and wherein such telescopic movement produces telescopic movement of the footpad;
    the stem second end comprises a first ring adapter configured to be installed over the first axle body, the first ring adapter comprises a threaded inner surface;
    the first-axle-body surface comprises threads configured to correspond with the first-ring-adapter-surface threads; and
    wherein the motor is configured to rotate the first axle such that the first ring adapter moves telescopically along the first-axle-body surface via an interactive screw action between the first-ring-adapter-surface threads and first-axle-body-surface threads.

7. The adjustable footrest system of claim 6, further comprising a mounting system configured to define slidable track movement of the stem first end along the underside of the footpad.

8. The adjustable footrest system of claim 6, wherein:
    the footrest base comprises a second ring-adapter configured to be installed over the second axle body, the second ring adapter comprises a threaded inner surface;
    the second-axle-body surface comprises threads configured to correspond with the second-ring-adapter-surface threads; and
    wherein the motor is configured to rotate the second axle such that the second ring adapter moves telescopically along the second-axle-body surface via an interactive screw action between the second-ring-adapter-surface threads and second-axle-body-surface threads.

9. The adjustable footrest system of claim 6, wherein the floorboard is covered with carpeting, and the footrest extends through a carpet cutout for movement of the footpad.

10. The adjustable footrest system of claim 8, wherein the adjustable footrest is configured for engagement by the left foot of a vehicle operator.

11. A method of assembling an adjustable footrest for an occupant of a vehicle, the method comprising:
    providing a footpad configured to extend from the foot well of the vehicle and for engagement by a foot;
    providing a motor comprising an elongated axle;
    providing a second motor comprising an elongated second axle connected to an adjustable footrest base;
    providing a stem configured to be mounted to the underside of the footpad at first end and to the axle at a second end;
    providing a first user switch;
    providing a second user switch;
    slidably mounting the stem to the underside of the footpad at the first end;
    mounting the stem to the axle at the second end;
    connecting the motor to the base of the footpad;
    connecting the second motor to the base of the footpad;
    mounting the base of the footpad to the foot well of the vehicle;
    installing the first user switch in the vehicle interior;
    installing the second user switch in the vehicle interior;

allowing the footplate to be movable from a first angular position to a second angular position in the manner as follows:
    moving the stem second end telescopically along the axle body during motor operation;
    producing sliding movement of the stem first end along the underside of the footpad, via the telescopic axle body movement of the stem second end; and
    producing angular movement of the footpad corresponding to the stem first end sliding movement;
allowing, the footplate to be movable from a first telescopic position to a second telescopic by moving the footrest base telescopically along the second axle body during second motor operation;
enabling control of the motor operation via the first user switch; and
enabling control of the second motor operation via the second user switch.

12. The method of assembling the footrest of claim 11, further comprising:
    providing a mounting system configured to define slidable track movement of the stem first end along the underside of the footpad;
    mounting the mounting system to the underside of the footpad; and
    allowing movement of the stem first end slidably along the footpad underside as defined by the mounting system.

13. The method of assembling the footrest of claim 11, wherein:
    the stem second end comprises a ring adapter configured to be installed over the axle body, the ring adapter comprises a threaded inner surface;
    the axle-body surface comprises threads configured to correspond with the ring adapter surface threads; and
    rotating the axle via the motor such that the ring adapter moves telescopically along the axle-body surface via an interactive screw action between the ring adapter surface threads and axle-body surface threads.

14. The method of assembling the footrest of claim 11, wherein the floorboard is covered with carpeting, and the footrest extends through a carpet cutout for movement of the footpad.

15. The method of assembling the footrest of claim 11, wherein the adjustable footrest is configured for engagement by the left foot of a vehicle operator.

16. The adjustable footrest of claim 1, wherein:
    the footrest base comprises a second ring adapter configured to be installed over the second axle body; the second ring adapter comprises a threaded inner surface;
    the second-axle-body surface comprises threads configured to correspond with the second-ring-adapter-surface threads; and
    wherein the motor is configured to rotate the second axle such that the second ring adapter moves telescopically along the second-axle-body surface via an interactive screw action between the second-ring-adapter-surface threads and second-axle-body-surface threads.

17. The method of assembling the footrest of claim 11, wherein:
    the footrest base comprises a second ring adapter configured to be installed over the second axle body; the second ring adapter comprises a threaded inner surface;
    the second-axle-body surface comprises threads configured to correspond with the second-ring-adapter-surface threads; and
    rotating the second axle via the second motor such that the second ring adapter moves telescopically along the second-axle-body surface via an interactive screw action between the second-ring-adapter-surface threads and second-axle-body-surface threads.

\* \* \* \* \*